US008780987B1

(12) United States Patent
Jia

(10) Patent No.: US 8,780,987 B1
(45) Date of Patent: Jul. 15, 2014

(54) METHOD AND APPARATUS FOR ENCODING VIDEO BY DETERMINING BLOCK RESOLUTION

(75) Inventor: Wei Jia, San Jose, CA (US)

(73) Assignee: Google Inc., Mountain View, CA (US)

( * ) Notice: Subject to any disclaimer, the term of this patent is extended or adjusted under 35 U.S.C. 154(b) by 398 days.

(21) Appl. No.: 13/095,967

(22) Filed: Apr. 28, 2011

(51) Int. Cl.
*H04N 7/50* (2006.01)
*H04N 7/26* (2006.01)

(52) U.S. Cl.
CPC ............ *H04N 7/50* (2013.01); *H04N 7/26244* (2013.01)
USPC ................................ 375/240.13; 375/240.02

(58) Field of Classification Search
CPC . H04N 7/50; H04N 7/26244; H04N 7/26031; H04N 7/26313; H04N 7/465; H04N 7/30; H04N 5/145; H04N 7/26765; H04N 7/26015
USPC ...................... 375/240.16, E07.125, E07.104, 375/E07.135, E07.193, E07.243, 375/240.02–240.29, 243, 244, 245, 375/E07.031, 27, 403, 408, 699, 450; 348/394, 403, 408, 699, 409, 450
See application file for complete search history.

(56) References Cited

U.S. PATENT DOCUMENTS

| | | | |
|---|---|---|---|
| 2009/0219993 A1* | 9/2009 | Bronstein et al. | ........ 375/240.03 |
| 2011/0051955 A1* | 3/2011 | Cui et al. | ...................... 381/94.1 |
| 2011/0051995 A1* | 3/2011 | Guo et al. | ...................... 382/100 |
| 2013/0039412 A1* | 2/2013 | Narroschke et al. | ..... 375/240.03 |

OTHER PUBLICATIONS

Down-Sampling for Better Transform Compression, by Alfred M. Bruckstein, Michael Elad, Ron Kimmel, IEEE Transactions on Image Processing, Feb. 2001.*
"Series H: Audiovisual and Multimedia Systems; Infrastructure of audiovisual services—Coding of moving video; Advanced video coding for generic audiovisual services". H.264. Version 1. International Telecommunication Union. Dated May 2003.
"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.
"Overview; VP7 Data Format and Decoder". Version 1.5. On2 Technologies, Inc. Dated Mar. 28, 2005.
"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.
"VP6 Bitstream & Decoder Specification". Version 1.02. On2 Technologies, Inc. Dated Aug. 17, 2006.

(Continued)

*Primary Examiner* — Dave Czekaj
*Assistant Examiner* — Dramos I Kalapodas
(74) *Attorney, Agent, or Firm* — Young, Basile, Hanlon & MacFarlane, P.C.

(57) ABSTRACT

Disclosed herein is a method for encoding a video signal, the video signal having at least one frame with a plurality of blocks having pixels. The method includes identifying a prediction mode for a block in the at least one frame, determining a residual for the block using the prediction mode, the residual having an original resolution, determining a variance based on the residual, and if the variance is greater than a predetermined value, reducing the original resolution of the residual to a lower resolution using a processor.

20 Claims, 4 Drawing Sheets

(56) References Cited

OTHER PUBLICATIONS

"Series H: Audiovisual and Multimedia Systems; Infrastructure of audiovisual services—Coding of moving video". H.264. Amendment 2: New profiles for professional applications. International Telecommunication Union. Dated Apr. 2007.

"VP6 Bitstream & Decoder Specification". Version 1.03. On2 Technologies, Inc. Dated Oct. 29, 2007.

"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.

"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.

"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.

"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.

"VP8 Data Format and Decoding Guide". WebM Project. Google On2. Dated: Dec. 1, 2010.

* cited by examiner

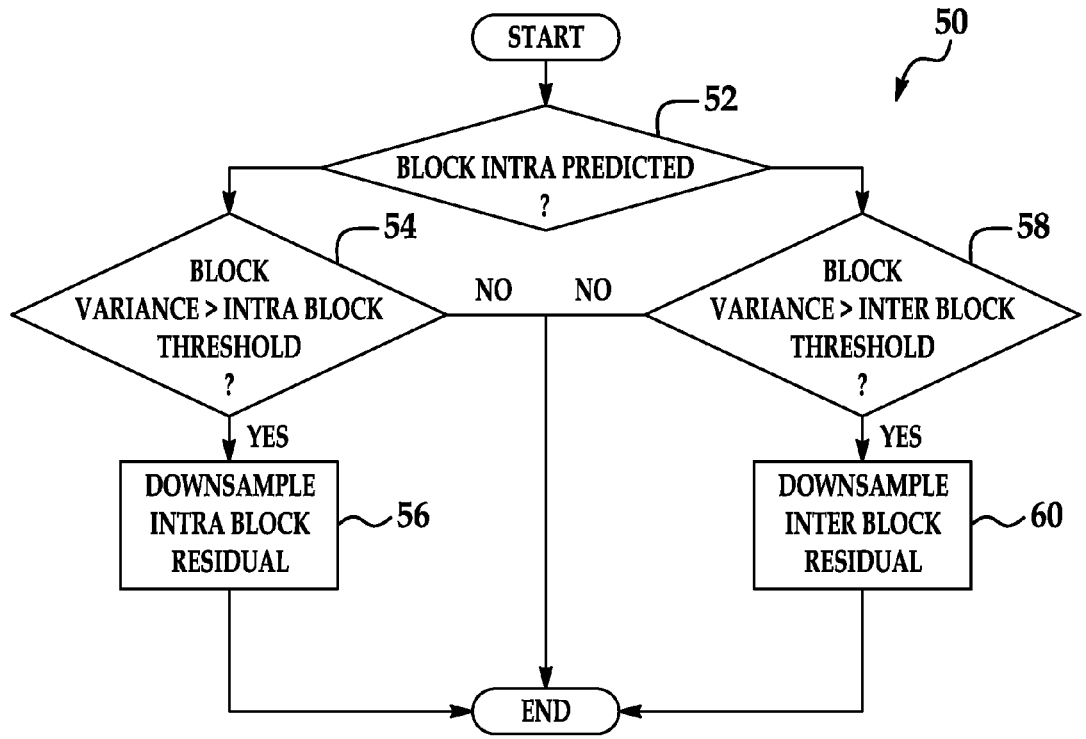
FIG. 2
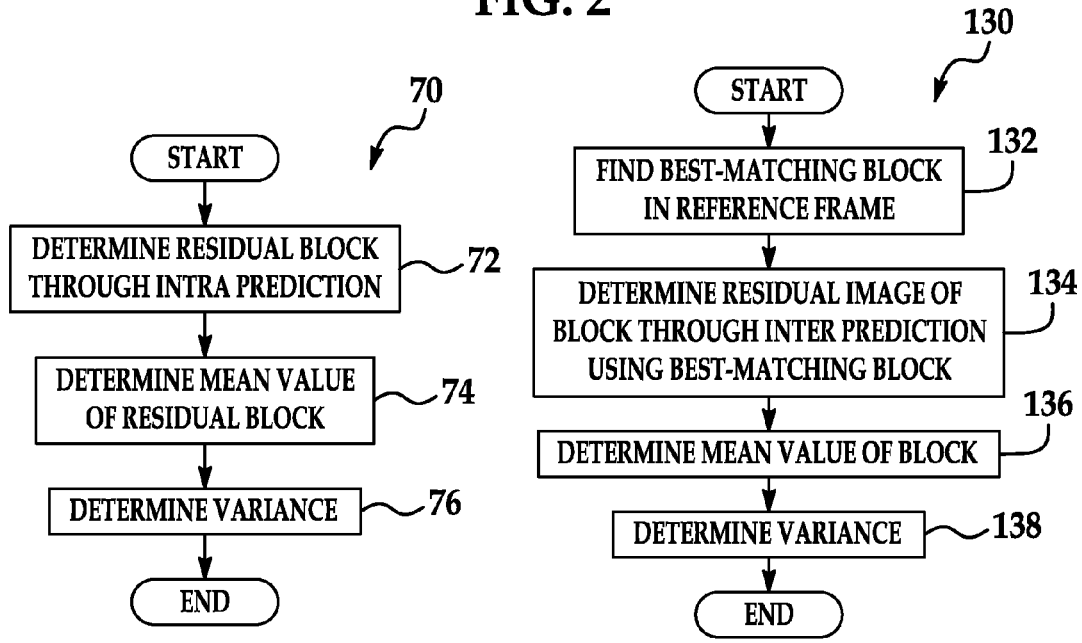
FIG. 3
FIG. 5

US 8,780,987 B1

METHOD AND APPARATUS FOR ENCODING VIDEO BY DETERMINING BLOCK RESOLUTION

TECHNICAL FIELD

The present invention relates in general to video signal transmission and particularly to the encoding and decoding of such a signal.

BACKGROUND

An increasing number of applications today make use of digital video signals for various purposes including, for example, business meetings between people in remote locations via video conferencing, high definition video entertainment, video advertisements, and sharing of user-generated videos. As technology is evolving, users have higher expectations for video quality and resolution even when video signals are transmitted over communications channels having limited bandwidth.

To permit transmission of digital video streams while limiting bandwidth consumption, a number of video compression schemes have been devised, including formats such as VPx, promulgated by Google Inc. of Mountain View, Calif., and H.264, a standard promulgated by ITU-T Video Coding Experts Group (VCEG) and the ISO/IEC Moving Picture Experts Group (MPEG), including present and future versions thereof. H.264 is also known as MPEG-4 Part 10 or MPEG-4 AVC (formally, ISO/IEC 14496-10).

These compression schemes can use quantization techniques on frames of a digital video stream to reduce the bitrate (i.e. data size) of the encoded digital video stream. These quantization techniques discard part of a frame's data using standard computations, thereby reducing the frame's bitrate. Although these quantization techniques reduce the bitrate, they may not suitably maintain the quality of the video signal.

SUMMARY

Embodiments of a method for encoding a video signal, the video signal having at least one frame with a plurality of blocks having pixels are disclosed herein. In one embodiment, the method includes identifying a prediction mode for a block in the at least one frame and determining a residual for the block using the prediction mode. The residual has an original resolution. The method also includes determining a variance based on the residual. If the variance is greater than a predetermined value, the method includes reducing the original resolution of the residual to a lower resolution using a processor.

Embodiments of an apparatus for encoding a video signal, the video signal having at least one frame with a plurality of blocks having pixels are disclosed herein. In one embodiment, the apparatus includes a memory and a processor configured to execute instructions stored in the memory to identify a prediction mode for a block in the at least one frame and determine a residual for the block using the prediction mode. The residual has an original resolution. The processor is also configured to execute instructions stored in the memory to determine a variance based on the residual and if the variance is greater than a predetermined value, reduce the original resolution of the residual to a lower resolution.

Embodiments of a method of determining a predetermined value usable in determining whether to reduce the resolution of a residual to be encoded in a video signal are disclosed herein. In one method, the method includes identifying a test sequence of blocks and determining a PSNR value and a variance value for substantially all of the blocks in the test sequence at the original resolution using a processor. The PSNR and the variance values at the original resolution are representative of a first curve. The method also includes determining a PSNR value and a variance value for each of the blocks in the set at the lower resolution using a processor. The PSNR and the variance values at the lower resolution are representative of a second curve. Further, the method includes selecting the predetermined value, wherein the predetermined value is an intersection of the first curve and the second curve.

These and other embodiments will be described in additional detail hereafter.

BRIEF DESCRIPTION OF THE DRAWINGS

The description herein makes reference to the accompanying drawings wherein like reference numerals refer to like parts throughout the several views, and wherein:

FIG. 2 is a flowchart diagram of an exemplary method of determining resolution for a block in the system of FIG. 1;

FIG. 3 is a flowchart diagram of an exemplary method of determining a variance for a block predicted by intra prediction usable in the method of FIG. 2;

FIG. 5 is a flowchart diagram of an exemplary method of determining a variance for a block predicted by inter prediction usable in the method of FIG. 2.

DETAILED DESCRIPTION

This Application hereby incorporates by reference in the entirety the following: co-pending U.S. patent application Ser. No. 13/095,968 filed on Apr. 28, 2011 and entitled "METHOD AND APPARATUS FOR ENCODING VIDEO BY DOWNSAMPLING FRAME RESOLUTION", co-pending U.S. patent application Ser. No. 13/096,285 filed on Apr. 28, 2011 and entitled "METHOD AND APPARATUS FOR ENCODING VIDEO USING GRANULAR DOWNSAMPLING OF FRAME RESOLUTION".

Figure 1:
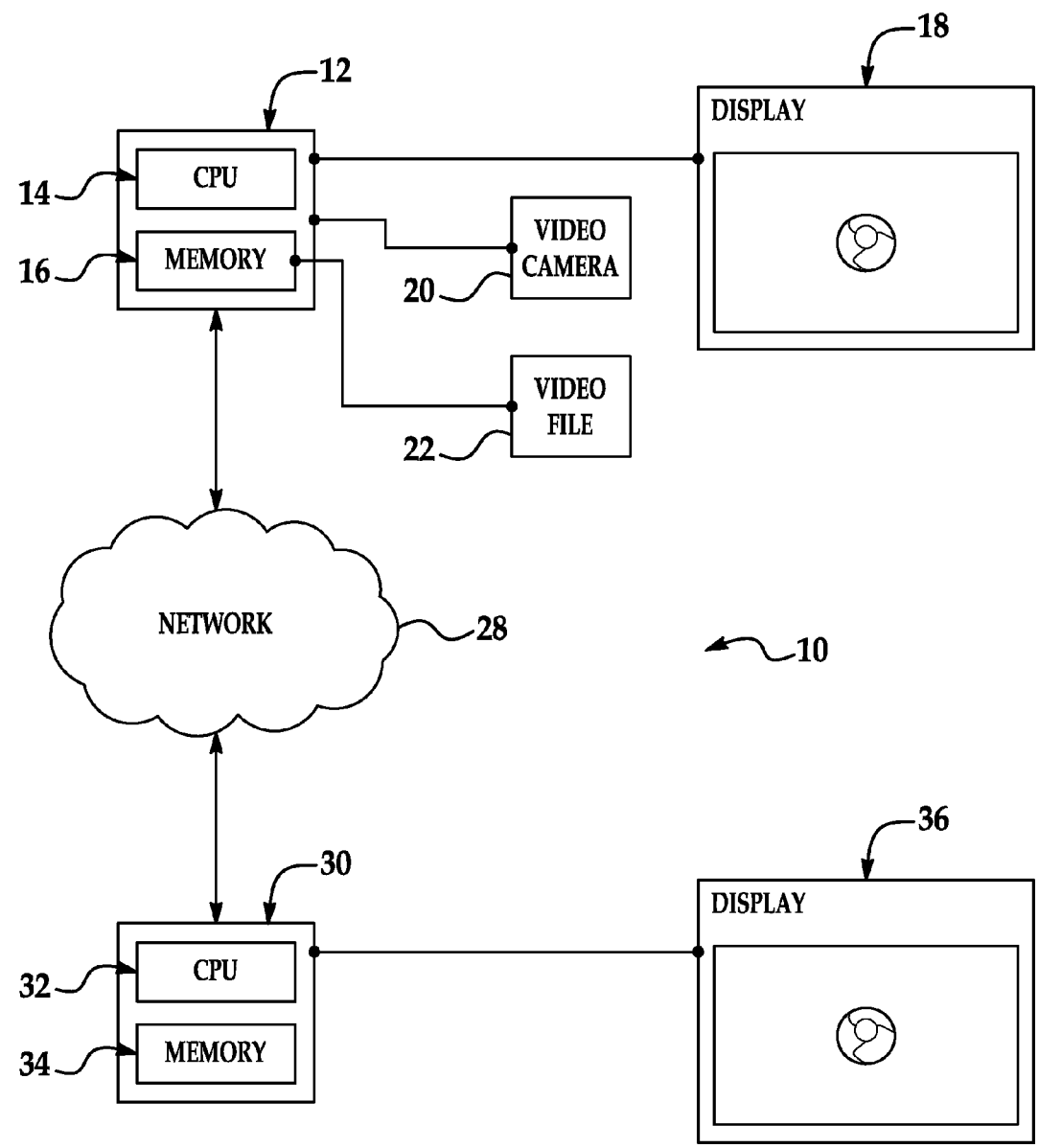
FIG. 1 is a block diagram of a video encoding and decoding system.

FIG. 1 is a diagram of an encoder and decoder system 10 for still or dynamic video images. An exemplary transmitting station 12 may be, for example, a computer having an internal configuration of hardware including a processor such as a central processing unit (CPU) 14 and a memory 16. CPU 14 can be a controller for controlling the operations of transmitting station 12. The CPU 14 is connected to memory 16 by, for example, a memory bus. Memory 16 may be random access memory (RAM) or any other suitable memory device. Memory 16 can store data and program instructions which are used by the CPU 14. Other suitable implementations of transmitting station 12 are possible.

A display 18 configured to display a video stream can be connected to transmitting station 12. Display 18 may be implemented in various ways, including by a liquid crystal display (LCD) or a cathode-ray tube (CRT). Display 18 may also be configured for other uses, such as screencasting. Alternatively, or in addition to display 18, a video stream can be generated from a video camera 20 or a received from a video file 22 and can be transferred to transmitting station 12.

A video stream can consist of a number of adjacent video frames (i.e. images), which may be still or dynamic. Adjacent video frames can be further subdivided into a single frame. At the next level, the frame can be divided into a series of blocks, which contain data corresponding to, for example, a 16×16 block of displayed pixels. Each block can contain luminance and chrominance data for the corresponding pixels. The blocks can also be of any other suitable size such as 16×8 pixel groups or 8×16 pixel groups. In other embodiments, video stream may only include a single frame and may be in applications such as screencasting.

A network 28 connects transmitting station 12 and a receiving station 30 for encoding and decoding of the video stream. Specifically, the video stream can be encoded by an encoder in transmitting station 12 and the encoded video stream can be decoded by a decoder in receiving station 30. Network 28 may, for example, be the Internet. Network 28 may also be a local area network (LAN), wide area network (WAN), virtual private network (VPN), or any other means of transferring the video stream from transmitting station 12.

Receiving station 30, in one example, may be a computer having an internal configuration of hardware include a processor such as a central processing unit (CPU) 32 and a memory 34. CPU 32 is a controller for controlling the operations of transmitting station 12. CPU 32 can be connected to memory 34 by, for example, a memory bus. Memory 34 may be RAM or any other suitable memory device. Memory 34 stores data and program instructions which are used by CPU 32. Other suitable implementations of receiving station 30 are possible.

FIG. 2 is a flowchart of an exemplary method of determining resolution for a current block in the system of FIG. 1. Method 50 can be implemented on the encoder of transmitting station 12. The encoder in transmitting station 12 may use different techniques to achieve compression. For example, many of these schemes use prediction modes that predict where information contained in a portion of a first frame or first region of a frame can be found in a second frame or second region of the frame. The difference between the prediction and the portion of data in the second frame or second frame region is calculated to form a residual that is encoded.

One type of prediction of prediction mode, known as intra prediction, can be based on previously coded image samples within the current frame. Intra prediction can be performed on a current block by, for example, copying pixels (or filtered pixels) from adjacent, previously coded blocks to predict the values in the current block. The manner in which the pixels are copied can be by vertical prediction, horizontal prediction, DC prediction, True Motion prediction, southwest prediction, southeast prediction, vertical right diagonal prediction, vertical left diagonal prediction, horizontal down prediction, horizontal up prediction, etc.

Intra prediction can also be performed using a technique other than copying pixel values. For example, intra prediction can be performed for a current block using one or more parameterized equations. These parameterized equations can be, for example, an expression representing a curve that has a "best fit" to a defined set of previously coded pixels in the frame. Other techniques of determining a predicted block using intra prediction are also possible.

Another type of prediction, known as inter prediction, can be based on previously coded frames ("reference frames"). Inter prediction can utilize block-based motion estimation and compensation to search for a sample region in a reference frame that, for example, closely matches a current block in a current frame. The matching sample region is subtracted from the current block to produce the residual that is encoded. A motion vector is also encoded that describes the position of the matching sample region relative to the position of the current block.

Method 50 describes a process for adaptively determining whether to encode a residual of the current block at a lower pixel resolution ("lower resolution") than its original pixel resolution ("original resolution"). The determination can be based on whether the current block is intra predicted or inter predicted and based on a variance calculation for the current block. Specifically, when the variance of the current block is high, the encoder will downsample the residual of the current. Encoding the residual at the lower pixel resolution when the variance of the block is high can provide higher quality encoding at a target bitrate (even if quantization is employed) as compared to the sole use of quantization to achieve the target bitrate.

For a current block that is to be encoded in a frame of a video stream, the encoder first checks whether the current block is intra predicted (52). If the current block is intra predicted, the encoder determines if a variance of the current block is greater than a predetermined intra block threshold (54).

FIG. 3 is a flowchart of an exemplary method 70 of determining the variance of the intra predicted current block. First, a residual block is determined by determining the difference between the current block and a predicted block (72). The predicted block, in this instance, is formulated using a type of intra prediction, as discussed previously.

Once the residual block is determined, the encoder can determine a mean value of the residual block (74). For example, the mean value can be calculated by averaging the values of all pixels within the residual block using the following equation:

$$\text{mean} = \frac{\sum_{i=0} \sum_{j=0} p_{i,j}}{N}; \text{ wherein} \tag{1}$$

i is a x-coordinate within the residual block;
j is a y-coordinate within the residual block;
$p_{i,j}$ is a value of a pixel located at the coordinates of i,j within the residual block; and
N is a number of pixels within the residual block.

The encoder can then determine the variance of the residual block (76). In one example, the variance is calculated using the following equation.

$$\text{variance} = \frac{\sum_{i=0} \sum_{j=0} |p_{i,j} - \text{mean}|}{N} \tag{2}$$

Specifically, the variance can be based on the absolute value of the difference between each pixel and the mean of the residual block. Equations (1) and (2) are exemplary only, and other techniques of determining the mean value and/or the variance are also possible.

Figure 4:
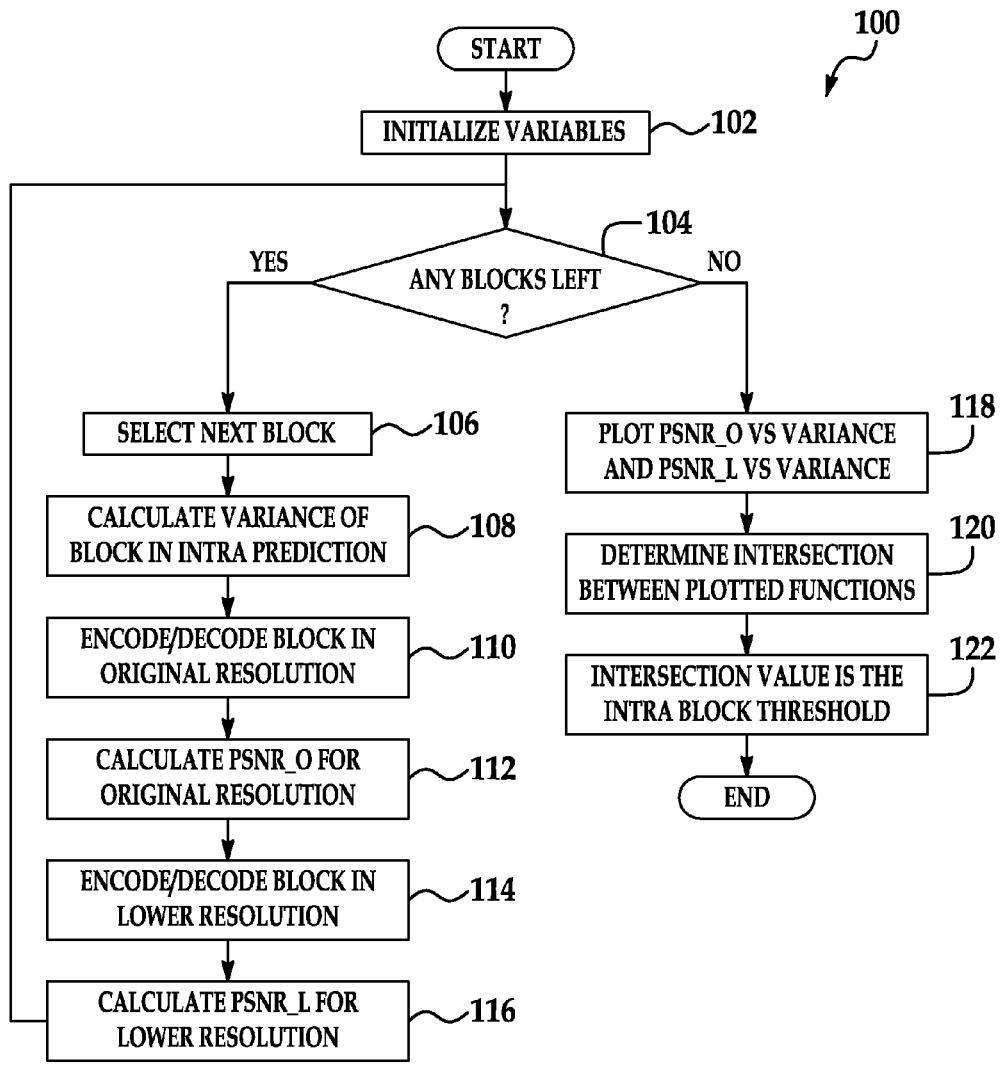
FIG. 4 is a flowchart diagram of an exemplary method of determining an inter block threshold value usable in the method of FIG. 2.

FIG. 4 is a flowchart of an exemplary method 70 of determining the intra block threshold. The intra block threshold can be a predetermined value that is determined by method 70 and then included in the encoder. First, any variables needed to determine the intra threshold can be initialized (102). Such variables can include, for example, one or more arrays for PSNR_O, PSNR_L, and block variance, which will be discussed in more detail below.

Method 100 operates on a test sequence of blocks. The test sequence of blocks can contain video data similar to that expected to be encoded. For example, in a screen casting encoding application, the test sequence of blocks can be blocks from an exemplary screen casting video data stream. In another example, if an encoder could be used for screen casting and for encoding of moving pictures (i.e. video clips and/or movies), the test sequence of blocks can include both blocks from a screen casting video data stream and a moving picture video data stream. The test sequence of blocks can also be based on video data from other sources.

Once variables are initialized, method 100 determines if any blocks are left to process in the test sequence of blocks (104). If there is at least one block left, the next block for processing is selected (106). The variance of the selected block can be calculated (108). One exemplary technique of calculating the variance of an intra predicted block is described previously with respect to FIG. 3. The selected block is encoded and then decoded using its original resolution (110). The encoding is performed to create an encoded block that is within a target bitrate.

An original resolution peak signal-to-noise-ratio (PSNR_O) will be calculated using the block and the decoded block (112). A PSNR value is a measure of quality comparing the original block and a lossy-encoded reconstructed (decoded) block. In this case, the PSNR_O measures the quality of the resulting decoded block after being compressed to the target bitrate using techniques other than the changing of pixel resolution (i.e. quantization).

The PSNR can be calculated using a mean squared error (MSE). The PSNR alternatively can be calculated using other techniques. The MSE can be calculated using the following exemplary equation:

$$MSE = \frac{1}{mn}\sum_{i=0}^{m-1}\sum_{j=0}^{n-1}[S(i,j) - D(i,j)]^2; \text{ wherein} \quad (3)$$

i is a x-coordinate;
j is a y-coordinate;
S is the selected block;
D is the decoded frame;
m is the width of the blocks S and D; and
n is the height of the blocks S and D.

The PSNR can be calculated using the following exemplary equation:

$$PSNR = 10\log_{10}\left(\frac{MAX_S^2}{MSE}\right); \text{ wherein} \quad (4)$$

$MAX_S$ is the maximum possible pixel value of the selected block.

Once the PSNR_O has been calculated, the selected block will be downsampled to a resolution less than the original resolution, the downsampled block will be encoded and then decoded, and the decoded downsampled block will then be upsampled to the original resolution (114). As with the encoding of the block at the original resolution, the encoding of the downsampled block is performed at the target bitrate in order to create a decoded upsampled block for comparison with the selected block. The resolution of the downsampled block can be determined using one or more predetermined lower resolutions. Alternatively, the resolution of the downsampled block can be determined on a block-by-block basis, selected by a user or any other technique.

A lower resolution peak signal-to-noise-ratio (PSNR_L) is then calculated (116). In this case, the PSNR_L measures the quality of the resulting decoded upsampled block after being compressed to the target bitrate using the technique of changing the pixel resolution.

Once the variance of an intra predicted block, PSNR_O, and PSNR_L have been calculated for the selected block, method 100 returns to determine if any additional blocks are available in the test sequence of blocks (104). Once there are no remaining blocks, method 100 includes plotting the variance, PSNR_O, and PSNR_L values calculated for each block (118). The plot includes two series of data. The first series includes the variance for each block versus the PSNR_O value corresponding to that block. The second series includes the variance for each block versus the PSNR_L corresponding to that block.

The first and second series can be plotted using fitted curve techniques. For example, an approximate fitted curve function can be determined to approximate each series. The fitted curve techniques used can include techniques such as the least squares method. Alternatively, the first and second series can be plotted using their actual values. Plotting may not involve the actual placement of data points on a coordinate plane. Rather, plotting may merely be an intermediate step performed by a processor.

Next, an intersection between the first series and the second series is determined (120). The intersection may be determined computationally by a processor based on the fitted curves determined for each series. But the intersection can also be determined using other methods. For example, a programmer or other person may select the intersection based on a plot of each series on a coordinate plane. The selected intersection is the intra block threshold (122). Alternatively, the selected intersection's value may be multiplied by a constant or processed by a standard function to normalize it for use in the encoder as the intra block threshold.

Returning to FIG. 2, if the block variance is greater than the intra block threshold (54), the method 50 ends. In other words, the current block is encoded using its original pixel resolution. Otherwise, the residual is downsampled to the lower resolution (56). This lower resolution can be any value less than the original resolution of the current block. The lower resolution is not necessarily the same lower resolution that was discussed previously with reference to FIG. 4. The lower resolution can be predetermined in the encoder, selected by a user, or determined during the encoding process or determined using other possible techniques. The residual of the current block is then encoded using the lower resolution.

If the block is not intra predicted and is rather, inter predicted, the encoder determines if a variance of the current block is greater than a predetermined intra block threshold (54).

FIG. 5 is a flowchart of an exemplary method 130 of determining the variance of the inter predicted current block. First, as discussed previously with respect to inter prediction, a predicted best-matching block (i.e. matching sample region) is found in a reference frame (132). The residual block is then determined by determining the difference between the current block and the predicted best-matching block (134).

Once the residual block is determined, the encoder can determine a mean value of the residual block (136). The mean value can be calculated using a similar technique described above with reference to FIG. 3 and equation (1). The encoder can then determine the variance of the residual block (138). The variance value can be calculated using a similar technique described above with reference to FIG. 2 and equation (2).

Figure 6:
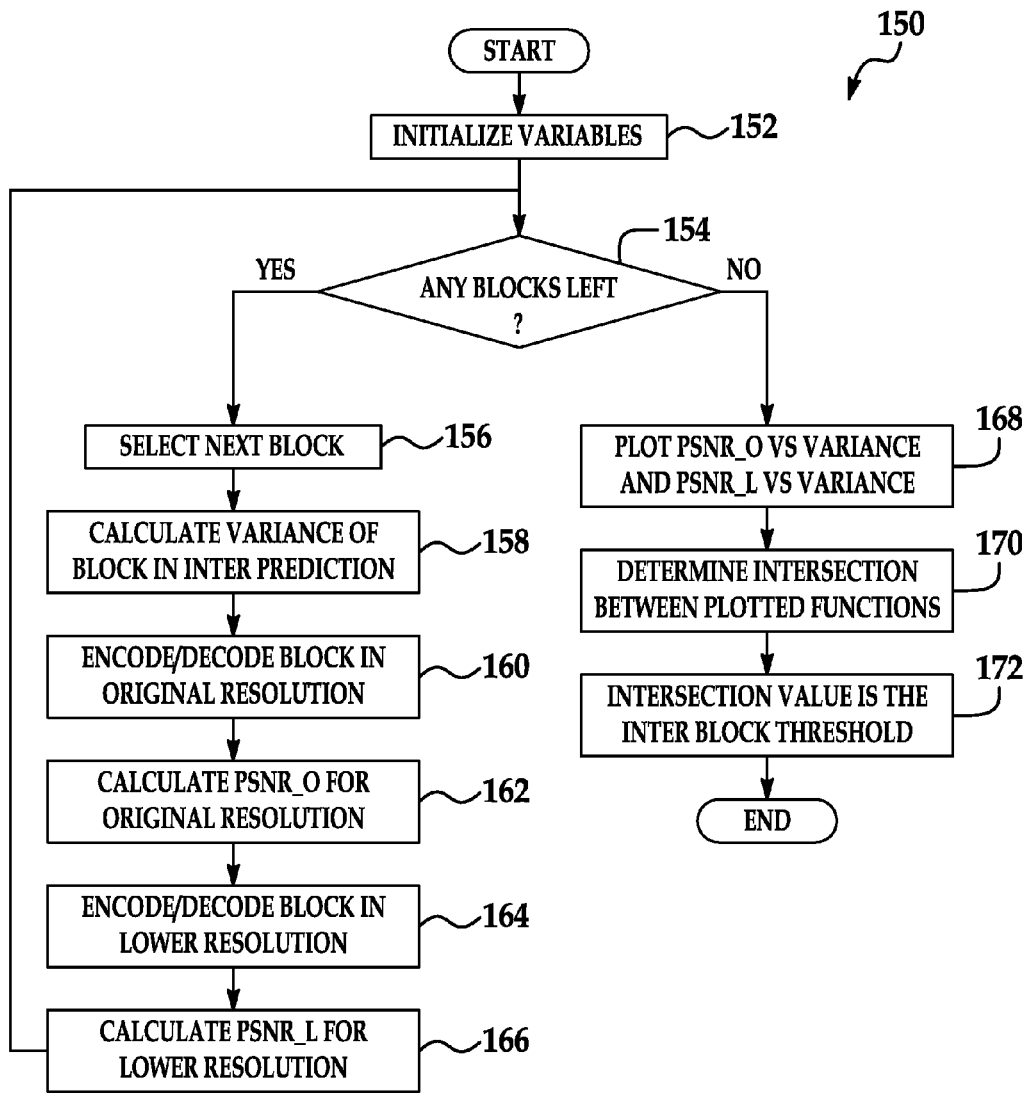
FIG. 6 is a flowchart diagram of an exemplary method of determining an inter block threshold value usable in the method of FIG. 2.

FIG. 6 is a flowchart of an exemplary method 150 of determining the inter block threshold. The inter block threshold can be a predetermined value that is determined by method 150 and then included in the encoder. First, any variables needed to determine the inter threshold can be initialized (162). Such variables can include, for example, one or more arrays for PSNR_O, PSNR_L, and block variance, which will be discussed in more detail below. These variables are not necessarily the same values as the PSNR_O, PSNR_L, and block variance discussed with reference to FIG. 4.

Method 150 operates on a test sequence of blocks. Similar to the test sequence of blocks discussed with reference to FIG. 4, the test sequence of blocks can contain video data similar to that expected to be encoded. The blocks included in the test sequence can be the same or different than the blocks in the test sequence of FIG. 4.

Once variables are initialized, method 150 determines if any blocks are left to process in the test sequence of blocks (154). If there is at least one block left, the next block for processing is selected (106). The variance of the selected block can be calculated (158). One exemplary technique of calculating the variance of an inter predicted block is described previously with respect to FIG. 5. The selected block is encoded and then decoded using its original resolution (160). The encoding is performed to create an encoded block that is within a target bitrate.

An original resolution peak signal-to-noise-ratio (PSNR_O) will be calculated using the block and the decoded block (162). A PSNR value is a measure of quality comparing the original block and a lossy-encoded reconstructed (decoded) block. In this case, the PSNR_O measures the quality of the resulting decoded block after being compressed to the target bitrate using techniques other than the changing of pixel resolution (i.e. quantization).

The PSNR can be calculated using a mean squared error (MSE). The PSNR alternatively can be calculated using other techniques. Specifically, the PSNR and MSE can be calculated using equation (3) and equation (4), respectively, described above with reference to FIG. 4.

Once the PSNR_O has been calculated, the selected block will be downsampled to a resolution less than the original resolution, the downsampled block will be encoded and then decoded, and the decoded downsampled block will then be upsampled to the original resolution (164). As with the encoding of the block at the original resolution, the encoding of the downsampled block is performed at the target bitrate in order to create a decoded upsampled block for comparison with the selected block. The resolution of the downsampled block can be determined using one or more predetermined lower resolutions. Alternatively, the resolution of the downsampled block can be determined on a block-by-block basis, selected by a user or any other technique.

A lower resolution peak signal-to-noise-ratio (PSNR_L) is then calculated (166). In this case, the PSNR_L measures the quality of the resulting decoded upsampled block after being compressed to the target bitrate using the technique of changing the pixel resolution.

Once the variance of an inter predicted block, PSNR_O, and PSNR_L have been calculated for the selected block, method 150 returns to determine if any additional blocks are available in the test sequence of blocks (154). Once there are no remaining blocks, method 150 includes plotting the variance, PSNR_O, and PSNR_L values calculated for each block (168). The plot includes two series of data. The first series includes the variance for each block versus the PSNR_O value corresponding to that block. The second series includes the variance for each block versus the PSNR_L corresponding to that block. Next, an intersection between the first series and the second series is determined (170). The selected intersection is the inter block threshold (172). Details of the process of plotting, determining and selecting the intersection value are similar to the details described in steps 118, 120 and 122 of FIG. 4 and thus, have been omitted here for simplicity.

Returning to FIG. 2, if the block variance is greater than the inter block threshold (58), the method 50 ends. In other words, the current block is encoded using its original pixel resolution. Otherwise, the residual is downsampled to the lower resolution (60). This lower resolution can be any value less than the original resolution of the current block. The lower resolution is not necessarily the same lower resolution that was discussed previously with reference to FIG. 4, FIG. 6 or the lower resolution that is selected for downsampling an intra predicted block in FIG. 2. Although in some embodiments, one or more of these lower resolutions may be the same value. The lower resolution can be predetermined in the encoder, selected by a user, or determined during the encoding process or determined using other possible techniques. The residual of the current block is then encoded using the lower resolution. Should Further, the residual be downsampled, it can be upsampled to the original resolution before that residual can be used as a reference for any subsequent blocks.

The encoder implementing method 50 can include one iteration ("single-pass") or two or more iterations ("two-pass") when processing blocks in the video stream. In a single-pass, blocks in the video stream are processed sequentially. The first pass in two-pass processing can be less computationally intensive and gather and store information about the video stream for use in a second pass. For example, the first pass can carry out motion estimation and variance calculation. In the second pass, the encoder can use this information to optimize final encoding of the video stream. The output of the second pass can be the final compressed bitstream sent to receiving station 30.

The operations of encoding and decoding can be performed in many different ways and can produce a variety of encoded data formats. The above-described embodiments of encoding or decoding may illustrate some exemplary encoding techniques. However, in general, encoding and decoding are understood to include any transformation or any other change of data whatsoever.

The embodiments of transmitting station 12 and/or receiving station 30 (and the algorithms, methods, instructions etc. stored thereon and/or executed thereby) can be realized in hardware, software, or any combination thereof including, for example, IP cores, ASICS, programmable logic arrays, quantum or molecular processors, optical processors, programmable logic controllers, microcode, firmware, microcontrollers, servers, microprocessors, digital signal processors or any other suitable circuit. In the claims, the term "processor" should be understood as encompassing any the foregoing devices, either singly or in combination. The terms "signal" and "data" are used interchangeably. Further, portions of transmitting station 12 and receiving station 30 do not necessarily have to be implemented in the same manner.

Further, in one embodiment, for example, transmitting station 12 or receiving station 30 can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

Transmitting station 12 and receiving station 30 can, for example, be implemented on computers in a screencasting system. Alternatively, transmitting station 12 can be implemented on a server and receiving station 30 can be implemented on a device separate from the server, such as a handheld communications device (i.e. a cell phone). In this instance, transmitting station 12 can encode content using an encoder into an encoded video signal and transmit the encoded video signal to the communications device. In turn, the communications device can then decode the encoded video signal using a decoder. Alternatively, the communications device can decode content stored locally on the communications device (i.e. no transmission is necessary). Other suitable transmitting station 12 and receiving station 30 implementation schemes are available. For example, receiving station 30 can be a personal computer rather than a portable communications device.

Further, all or a portion of embodiments of the present invention can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for encoding a video signal, the video signal having at least one frame with a plurality of blocks having pixels, comprising:
   identifying a prediction mode for a block in the at least one frame;
   determining a residual for the block using the prediction mode, the residual having an original resolution;
   determining a variance based on the residual;
   when the variance is greater than a predetermined value, reducing the original resolution of the residual to a lower resolution using a processor, wherein the predetermined value is a value at an intersection of a first curve and a second curve, the first curve representative of a peak signal-to-noise ratio value and a variance value for each block in a test sequence calculated at the original resolution and the second curve representative of a peak signal-to-noise value and a variance value for each block in the test sequence calculated at lower resolution; and
   encoding the residual.

2. The method of claim 1, wherein the prediction mode is at least one of intra prediction or inter prediction.

3. The method of claim 2, wherein determining the residual comprises:
   when the prediction mode is intra prediction, calculating the residual only with reference to the at least one frame.

4. The method of claim 2, wherein determining the residual comprises:
   when the prediction mode is inter prediction, calculating the residual only with reference to a frame other than the at least one frame.

5. The method of claim 2, wherein the prediction mode is intra prediction and wherein reducing the original resolution comprises:
   when the variance is greater than the intra threshold, reducing the original resolution of the residual to the lower resolution; and
   when the variance is less than the intra threshold, maintaining the residual at the original resolution.

6. The method of claim 5, if the variance is equal to the intra threshold, maintaining the residual at the original resolution.

7. The method of claim 2, wherein the prediction mode is inter prediction and wherein reducing the original resolution comprises:
   when the variance is greater than the inter threshold, reducing the original resolution of the residual to the lower resolution; and
   when the variance is less than the inter threshold, maintaining the residual at the original resolution.

8. The method of claim 7, if the variance is equal to the inter threshold, maintaining the residual at the original resolution.

9. The method of claim 1, wherein determining the variance comprises:
   determining an average value of substantially all pixel values in the residual; and
   summing the absolute difference between each pixel value in the residual and the average value, wherein an average of the summed absolute differences is the variance.

10. The method of claim 1, wherein reducing the resolution of the residual comprises:
    downsampling the residual.

11. The method of claim 1, wherein each of the blocks in the test sequence is one of intra predicted and inter predicted.

12. An apparatus for encoding a video signal, the video signal having at least one frame with a plurality of blocks having pixels, comprising:
    a memory; and
    a processor configured to execute instructions stored in the memory to:
    identify a prediction mode for a block in the at least one frame;
    determine a residual for the block using the prediction mode, the residual having an original resolution;
    determine a variance based on the residual;
    when the variance is greater than a predetermined value, reduce the original resolution of the residual to a lower resolution, wherein the predetermined value is a value at an intersection of a first curve and a second curve, the first curve representative of a peak signal-to-noise ratio value and a variance value for each block in a test sequence calculated at the original resolution and the second curve representative of a peak signal-to-noise value and a variance value for each block in the test sequence calculated at lower resolution; and
    encode the residual residual.

13. The apparatus of claim 12, wherein the prediction mode is at least one of intra prediction or inter prediction.

14. The apparatus of claim 13, wherein the processor is further configured to execute instructions stored in the memory to:
    when the prediction mode is intra prediction, calculate the residual only with reference to the at least one frame; and when the prediction mode is inter prediction, calculate the residual only with reference to a frame other than the at least one frame.

15. The apparatus of claim 13, wherein the prediction mode is intra prediction and wherein the processor is further configured to execute instructions stored in the memory to:
- when the variance is greater than the intra threshold, reduce the original resolution of the residual to the lower resolution; and
- when the variance is less than the intra threshold, maintain the residual at the original resolution.

16. The apparatus of claim 13, wherein the prediction mode is inter prediction and wherein the processor is further configured to execute instructions stored in the memory to:
- when the variance is greater than the inter threshold, reduce the original resolution of the residual to the lower resolution; and
- when the variance is less than the inter threshold, maintain the residual at the original resolution.

17. The apparatus of claim 12, wherein the processor is further configured to execute instructions in the memory to:
- determine an average value of substantially all pixel values in the residual; and
- sum the absolute difference between each pixel value in the residual and the average value, wherein an average of the summed absolute differences is the variance.

18. A method of determining a predetermined value usable in determining whether to reduce the resolution of a residual to be encoded in a video signal:
- identifying a test sequence of blocks;
- determining a peak signal-to-noise ratio value and a variance value for substantially all of the blocks in the test sequence at the original resolution using a processor, wherein the peak signal-to-noise ratio and the variance values at the original resolution are representative of a first curve;
- determining a peak signal-to-noise ratio value and a variance value for each of the blocks in the set at the lower resolution using the processor, wherein the peak signal-to-noise ratio and the variance values at the lower resolution are representative of a second curve; and
- selecting the predetermined value, wherein the predetermined value is an intersection of the first curve and the second curve.

19. The method of claim 18, wherein each one of blocks in the test sequence is one of intra predicted and inter predicted.

20. The method of claim 1, wherein determining the variance based on the residual includes determining an absolute value of a difference between each pixel in the residual block and a mean of the residual block.

* * * * *